(12) United States Patent
Wang et al.

(10) Patent No.: US 7,200,497 B2
(45) Date of Patent: Apr. 3, 2007

(54) TEST SYSTEM AND METHOD FOR PORTABLE ELECTRONIC APPARATUS

(75) Inventors: Chih-Cheng Wang, Tainan (TW); Hung-Yang Wu, Tao Yuan Shien (TW); Chuan-Hung Chiang, Dali (TW)

(73) Assignee: Quanta Computer Inc., Tao Yuan Shien (TW)

( * ) Notice: Subject to any disclaimer, the term of this patent is extended or adjusted under 35 U.S.C. 154(b) by 38 days.

(21) Appl. No.: 11/091,444

(22) Filed: Mar. 29, 2005

(65) Prior Publication Data
US 2005/0222690 A1 Oct. 6, 2005

(30) Foreign Application Priority Data
Apr. 1, 2004 (TW) .............................. 93109137 A

(51) Int. Cl.
*G01R 15/00* (2006.01)
(52) U.S. Cl. .................... 702/57; 348/187; 348/188; 248/187.1
(58) Field of Classification Search ................ 702/57; 348/187, 188; 248/187.1
See application file for complete search history.

(56) References Cited

U.S. PATENT DOCUMENTS

| 5,734,158 | A | * | 3/1998 | Nagashima et al. | ......... 250/225 |
| 6,075,601 | A | * | 6/2000 | Marcus et al. | .............. 356/497 |
| 6,913,470 | B1 | * | 7/2005 | Lafleur | ........................ 439/71 |
| 2001/0024249 | A1 | * | 9/2001 | Moon | ........................... 349/65 |
| 2002/0030775 | A1 | * | 3/2002 | De Schipper | ............... 349/113 |
| 2004/0189812 | A1 | * | 9/2004 | Gustavsson et al. | ... 348/207.99 |

\* cited by examiner

*Primary Examiner*—Marc S. Hoff
*Assistant Examiner*—Janet L Suglo
(74) *Attorney, Agent, or Firm*—Rabin & Berdo, P.C.

(57) ABSTRACT

A test system for testing a portable electronic apparatus is described. The test system has at least a display, a platform, and a controller. The controller controls the display to display test images in sequence. The controller commands the portable electronic apparatus, via a test interface, to capture the test images on the display to generate image data. The controller determines whether the image data meet a predetermined test requirement. The test system can further include at least a light source and a reflector. The reflector reflects the light on the display, so that the display reaches a predetermined uniformity of light.

20 Claims, 4 Drawing Sheets

TEST SYSTEM AND METHOD FOR PORTABLE ELECTRONIC APPARATUS

RELATED APPLICATIONS

The present application is based on, and claims priority from, Taiwan Application Serial Number 93109137, filed Apr. 1, 2004, the disclosure of which is hereby incorporated by reference herein in its entirety.

BACKGROUND

1. Field of Invention

The present invention relates to a test system. More particularly, the present invention relates to a test system for testing a portable electronic apparatus. The portable electronic apparatus has a digital image capturing module.

2. Description of Related Art

Because of the fast development of communication technology, cell phones have become important and popular communication tools. Additionally, owing to the development of image technology, digital cameras have become the main-stream of image-capturing products. Therefore, a cell phone having a digital camera will be an important consumer electronic product in the near future.

Product testing is an important part of the manufacturing process of a cell phone having a digital camera. To determine quickly and efficiently whether the product meets a predetermined standard is very important. It also helps reduce the cost of manufacturing.

Conventionally, the test of the cell phone having a digital camera is accomplished by multiple test stations for only one type of cell phone. Only one test slide is used in one station to test a specific function of the cell phone. The test result is viewed and judged by human eyes. Human reading of the serial number of the cell phone and changing of the test slide are time-consuming processes and easily incur mistakes. Therefore, the conventional test method has the disadvantages of manpower consumption, low speed, and low accuracy in test result judgment.

Moreover, if an efficient shop floor system is not included in the test, repeated or unnecessary tests may happen. Because there are many different types of cell phones, test equipment may be wasted if one test station is only suitable for a specific type of cell phone.

SUMMARY

It is therefore an objective of the present invention to provide a test system and method, where a portable electronic apparatus can be tested in a faster and easier process.

It is another objective of the present invention to provide a test system and method that save labor power.

It is still another objective of the present invention to provide a test system and method, where the test system becomes more efficient by using a database, such as shop floor system.

It is still another objective of the present invention to provide a test system and method, where different types of portable electronic apparatuses can be tested by using different types of holders.

It is still another objective of the present invention to provide a test system and method, where the test system uses a display to show test images for the digital image capturing module to capture, and the display is conveniently available on the market.

It is still another objective of the present invention to provide a test system and method, where the display is used to replace the conventional light box and conventional test slides, so that time and cost are greatly saved. The test system is also easier to control automatically by a program.

In accordance with the foregoing and other objectives of the present invention, a test system for testing a portable electronic apparatus is described. The test system includes a display, a platform, and a controller. The display is used for displaying at least one test image. The platform is used for keeping the portable electronic apparatus at a distance from the display. The distance is suitable for the portable electronic apparatus to capture the test image displayed on the display.

The controller is connected to the display. The controller controls the display to display the test images sequentially. The controller commands the portable electronic apparatus, via a test interface, to capture the test images to produce image data. The controller determines whether the image data meets a predetermined requirement.

The display is, for example, an LCD panel. The portable electronic apparatus is, for example, a cell phone and the cell phone has a digital camera module. The controller is, for example, a computer. The test system optionally further comprises a light source and a reflector. The reflector reflects the light emitting from the light source to the LCD panel so that the LCD panel reaches a predetermined and uniform brightness. The controller reads the serial number of the portable electronic apparatus via the test interface. The controller sends the serial number and the test result of the image data to a server. The server uses the serial number and the test result to establish a database.

In accordance with the foregoing and other objectives of the present invention, a test method for testing a portable electronic apparatus is also provided. The test method includes the following steps. First, at least one test image is sequentially displayed on the display. Then, the portable electronic apparatus is commanded, via a test interface, to capture the test images to produce image data. Next, a test process is performed on the image data to determine whether the image data meets a predetermined requirement. The portable electronic apparatus is, for example, a cell phone. The digital image capturing module is, for example, a digital camera module. The controller is, for example, a computer.

The method can further include the following step. At least one reflector is used to reflect the light emitting from at least one light source to the LCD panel so that the LCD panel reaches a predetermined and uniform brightness.

The method can also include the following steps. First, the serial number of the portable electronic apparatus is read by the computer via the test interface and the serial number is sent to a server. Then, the test result of the image data is sent to the server. Next, the serial number and the test result are used to establish a database.

The invention has at least the following advantages. Each embodiment can present one or more of these advantages. Because the controller automatically controls the predetermined test procedure, a portable electronic apparatus can be tested in a faster and easier way. The invention can also save labor power. Because the test system can test different test images according to a predetermined procedure, a plurality of types of portable electronic apparatus can be tested in one test station. Moreover, because the test system can be connected to a server, the test system can be more efficient by using a database, such as a shop floor system. Because the holder can be replaced, different types of portable electronic apparatuses can be tested by using different types of holders.

The invention uses a display to show test images for the digital image capturing module to capture, where the display is conveniently available on the market. The display is used to replace the conventional light box and conventional test slides, so time and cost are greatly saved. The test system is also easier to control automatically by a program.

It is to be understood that both the foregoing general description and the following detailed description are examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1A:
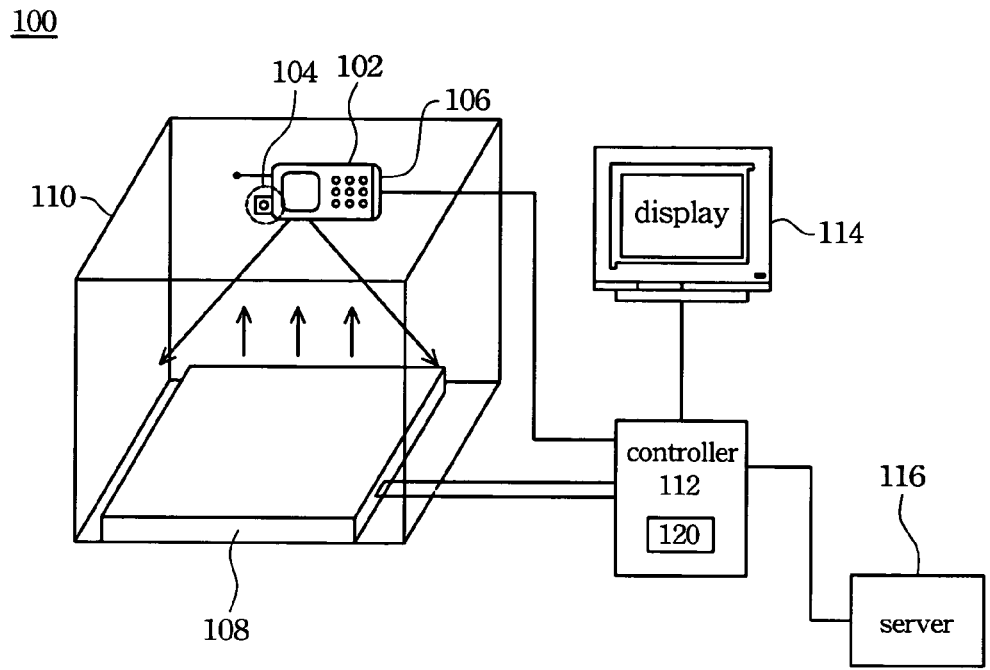
FIG. 1A is a diagram illustrating an embodiment of the test system according to the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1A is a diagram illustrating an embodiment of the test system according to the invention. The test system 100 is used to test a portable electronic apparatus 102. The portable electronic apparatus 102 has a digital image capturing module 104 and a test interface 106. The test system 100 includes a display 108, a platform 110, and a controller 112.

The display 108 is used to display at least one test image. The portable electronic apparatus 102 is placed on the platform 110 so that the portable electronic apparatus 102 is kept at a distance from the display 108. The distance is suitable for the portable electronic apparatus 102 to capture the test images.

The controller 112 is connected to the display 108. The controller 112 is used to control the display 108 to display the test images sequentially. The controller 112 commands the portable electronic apparatus 102, via a test interface 106, to capture the test images to produce image data. The controller 112 determines whether the image data meets a predetermined requirement.

The portable electronic apparatus 102 is, for example, a cell phone, a personal digital assistant (PDA), or a digital camera. The display 108 is, for example, a liquid crystal display (LCD) panel. The controller 112 is, for example, a computer. The test interface 106 is, for example, an RS 232 interface. The digital image capturing module 104 is, for example, a digital camera module.

For example, the controller 112 controls the display 108 and determines a predetermined test procedure. The predetermined, test procedure is, for example, sequentially displaying a plurality of test images on the display 108. When one test image is displayed on the display 108, the controller 112 informs the portable electronic apparatus 102, via the test interface 106, to capture the test image with the digital image capturing module 104. After the image is captured, image data are produced. The portable electronic apparatus 102 sends the image data to the controller 112 via the test interface 106. The controller 112 performs a test process on the image data to determine whether the image data meet a predetermined requirement.

With reference to FIG. 1A, the test system 100 can include a second display 114 for monitoring the operation of the test system 100. A graphic card supporting two displays can be installed in the controller 112 (such as a computer) to control the two displays. The graphic card 120 supporting two displays is, for example, ELSA GLTM T2-64s graphic card. The display 114 can be used to show the test result of the image data. For example, the display 114 can show the serial number of the portable electronic apparatus, the test items, or passage or failure of the test. The display 114 can also show both the test image and the captured image. The information displayed on the display 114 allows a person in charge of the test system to understand easily the situation of the test system.

The test system 100 can include a server 116. The server 116 is connected to the controller 112. The server 116 has a database. The database records data regarding each portable electronic apparatus that is going to be tested or has been tested. The recorded data includes, for example, serial numbers, test items that have been tested or have not been tested, passage or failure of the test, test result data, and test status. Before a portable electronic apparatus 102 is tested, the controller 112 compares the serial number of the portable electronic apparatus 102 in the database in the server 116 through a network to know the test status of the portable electronic apparatus 102. For example, the information regarding whether the portable electronic apparatus 102 has been tested, whether the portable electronic apparatus 102 has passed the test, or what further tests in the database must be performed on the portable electronic apparatus 102. The tests and comparisons mentioned above can be performed using software in the controller 112 or in the server 116.

After the portable electronic apparatus 102 has been tested, the serial number of the portable electronic apparatus 102 can be sent to the server 116 via the controller 112. The test result of the image data can also be sent to the server 116. The server 116 records the serial number and the test result in the database. The database is, for example, a shop floor system. The step of comparing the serial number with the database is, for example, a portion of a flow control management.

Figure 1B:
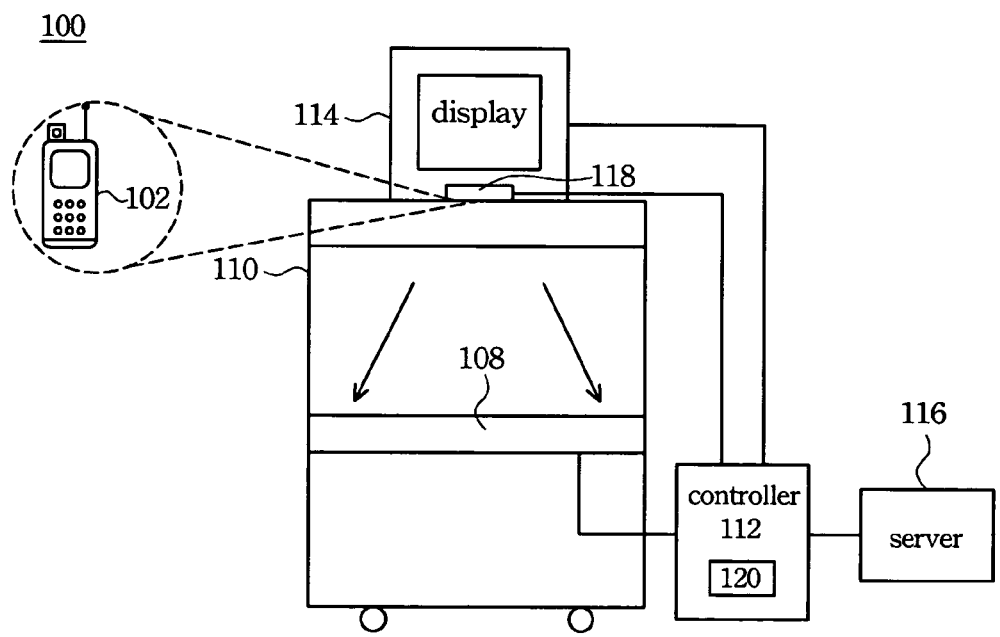
FIG. 1B is a diagram illustrating an exemplary test system according to the invention.

FIG. 1B is a diagram illustrating an exemplary test system according to the invention. With reference to FIG. 1B, the portable electronic apparatus 102 is placed in a holder 118. For example, when the portable electronic apparatus 102 is placed into the holder 118, the holder 118 holds the portable electronic apparatus tightly. Pins on the holder 118 contact the portable electronic apparatus 102 so that the test interface of the portable electronic apparatus 102 is connected and signals can be transmitted through the test interface to the controller 112. The test interface is, for example, an RS 232 interface. The controller 112 can also transmit commands via the pins and the test interface to the portable electronic apparatus 102.

During test, the portable electronic apparatus 102 captures the test images on the display 108. The display 114 shows the test status and the server 116 provides a database for comparison. System details in FIG. 1B are the same as FIG. 1A.

Figure 2A:
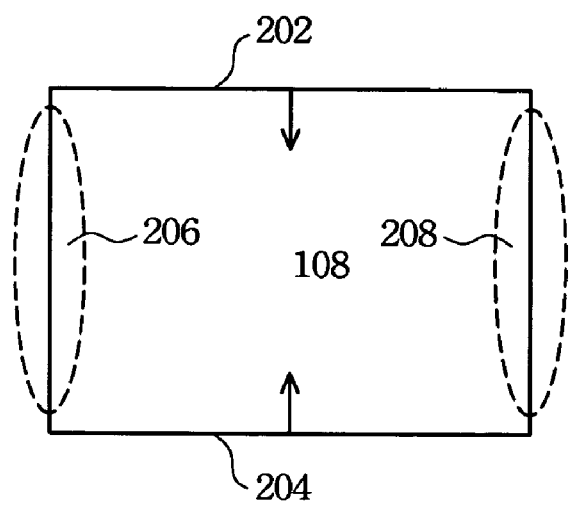
FIG. 2A is a diagram illustrating the front of an LCD panel.

In this embodiment, the display 108 is, for example, a liquid crystal display (LCD) panel. The display 108 is used to replace a conventional light box. FIG. 2A is a diagram illustrating the front of an LCD panel. The light of a conventional LCD panel is generated from the top and the bottom side of the panel. With reference to FIG. 2A, the light is generated from the upper edge 202 and the lower edge 204. Therefore, the side area 206 and side area 208 are darker than other areas of the LCD panel 108. The LCD panel 108 does not reach a uniform brightness. To reach a uniform brightness, the invention uses reflectors to compensate the brightness on the LCD panel.

Figure 2B:
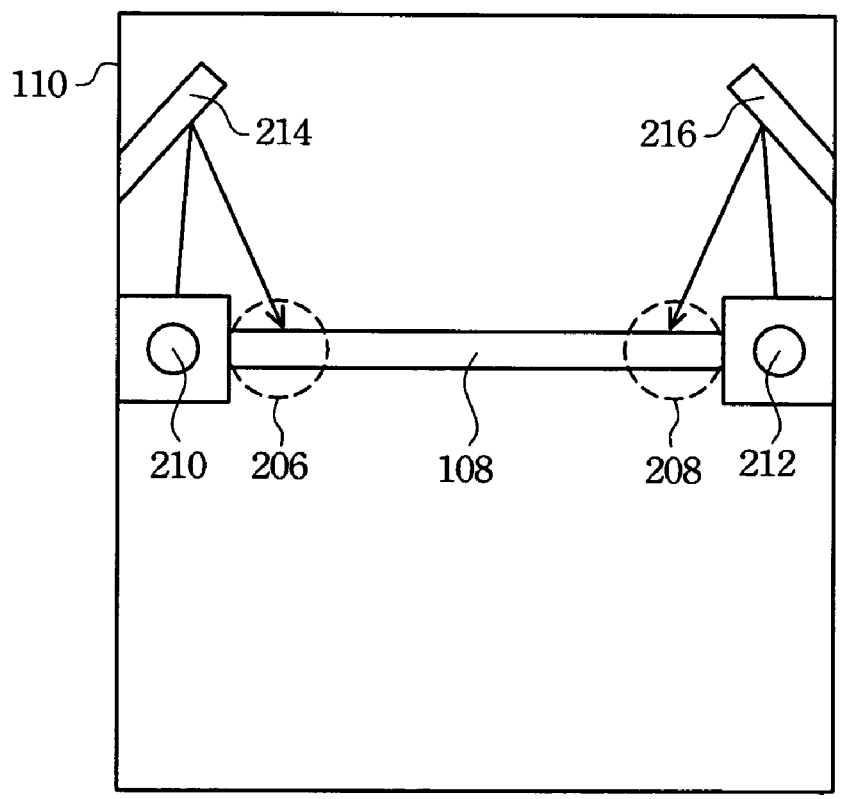
FIG. 2B is a diagram illustrating a light compensation apparatus for the test system according to the invention.

FIG. 2B is a diagram illustrating a light compensation apparatus for the test system according to the invention. With reference to FIG. 2A and FIG. 2B, light sources 210 and 212 are added to the side areas 206 and 208. The light sources 210 and 212 emit light. The light is reflected by the reflectors 214 and 216 to the side areas 206 and 208, so that the LCD panel can reach a predetermined and uniform brightness.

Figure 3:
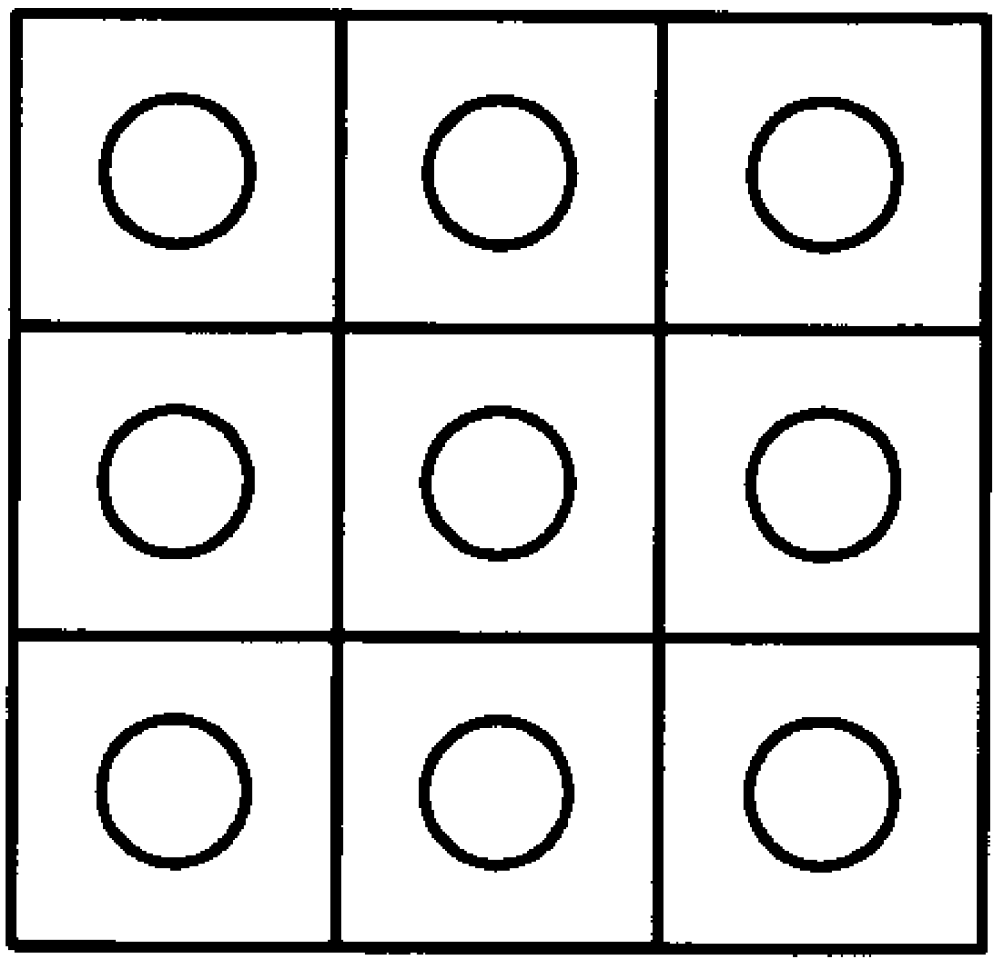
FIG. 3 is a diagram illustrating a nine-area brightness test.

The method for detecting the uniformity of brightness is as follows. Conventionally, a light box and a test slide are used for the image capturing module 104 to capture images. In an experiment, a light box having a color temperature of 5100 K is used and the brightness test for 9 areas shows that the brightness in each area is between 1060−10 cd/m$^2$ and 1060+10 cd/m$^2$, where cd represents candela. FIG. 3 is a diagram illustrating the nine-area brightness test. With reference to FIG. 3, the total area under test is divided into nine areas. The brightness test is performed on the center of each area. Using this method, the 5100 K light box mentioned above has a brightness of between 1060−10 cd/m$^2$ and 1060+10 cd/m$^2$ for each area.

In this embodiment, an LCD panel replaces the light box. The color temperature of the LCD panel can be adjusted. For example, a Viewmatch Color adjustment function can be used to adjust the color temperature. Usually, a 9300 K, 6500K, 5100 K color temperature, or Use Mode are available for a user to choose from. For an LCD panel, using the above nine-area brightness test, the smallest brightness value is subtracted from the largest brightness value to produce a difference value. The difference value is divided by the largest value to produce a ratio. When the ratio is smaller than 30%, the brightness of the total area is considered uniform. In other words, to achieve and uniform brightness, the ratio mentioned above has to be adjusted to be smaller than 30%.

Figure 4:
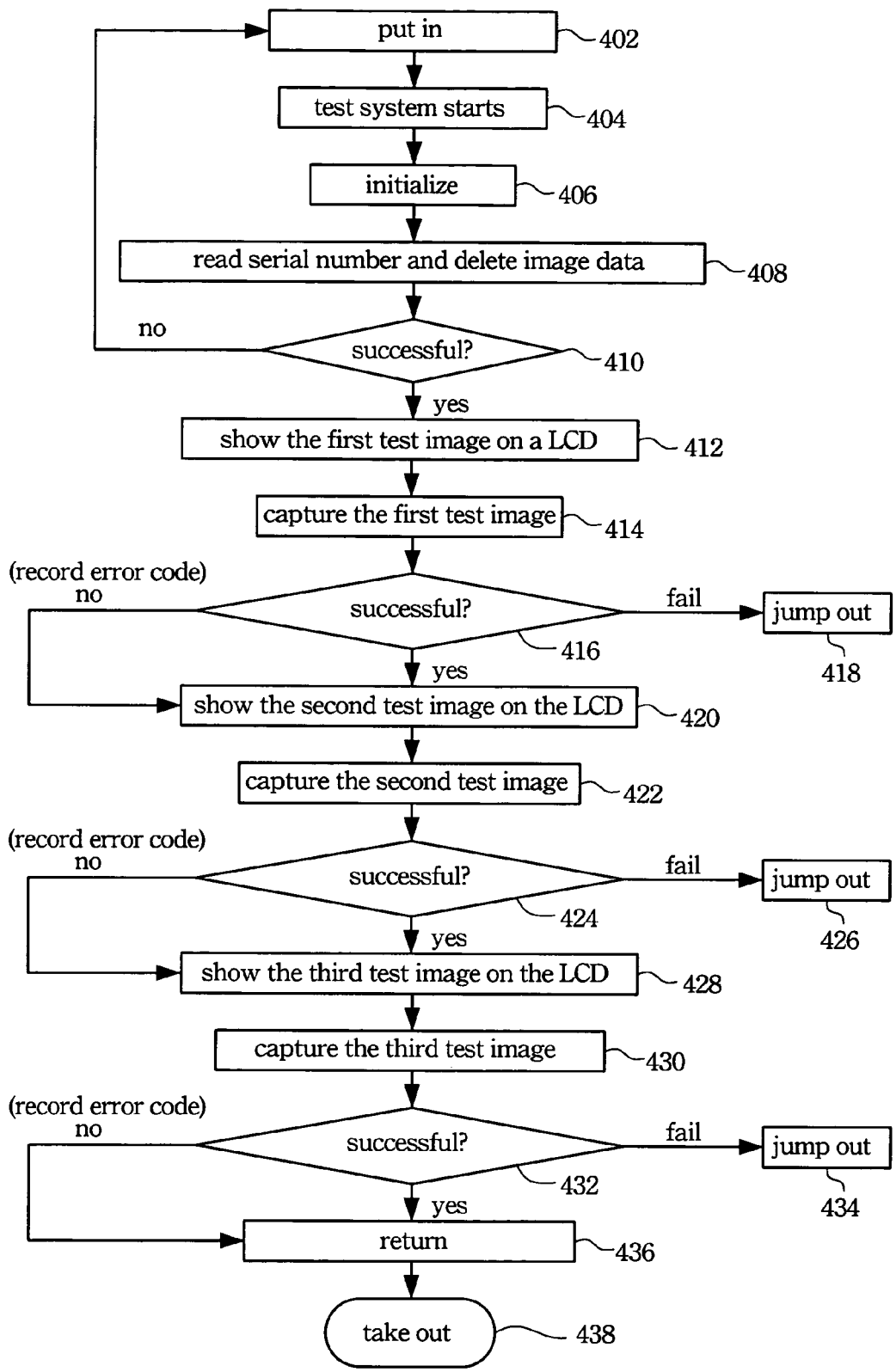
FIG. 4 is an exemplary flow chart illustrating a test flow of the test system according to the invention.

FIG. 4 is an exemplary flow chart illustrating a test flow of the test system according to the invention. With reference to FIG. 1A, FIG. 1B, and FIG. 4, the test flow can be used in the test system. First, a portable electronic apparatus 102 is placed in a holder 118 (step 402). Then, the holder 118 holds the portable electronic apparatus 102 tightly and pins on the holder 118 are connected to the portable electronic apparatus 102. The test system 100 supplies electrical power to the portable electronic apparatus 102 and the portable electronic apparatus 102 is turned on (step 404). Following that, the portable electronic apparatus 102 begins operating (step 406).

Next, the test system 100 reads the serial number of the portable electronic apparatus 102 through the controller 112 and sends the serial number to a server 116 for comparison (step 408). The server 116 compares the serial number in a database to determine the test status of the portable electronic apparatus 102. If the portable electronic apparatus 102 is found to have been tested, no further tests are needed. Moreover, the controller 112 or the server 116 can determine what tests need be performed on the portable electronic apparatus 102. Software can be used to modify the flow of the test sequence. It is very convenient and flexible to use software in the test system 100.

Before the test is performed, the images previously stored in the portable electronic apparatus 102 can be deleted (step 408). The test system 100 determines whether the deletion is completed (step 410). If the deletion is successful, the next step is performed. If the deletion fails, the test system 100 goes back to step 402. Next, a first test image is displayed on the display 108 (such as an LCD panel) (step 412). Then, the controller 112 commands the portable electronic apparatus 102 to capture the first test image (step 414). Following that, the portable electronic apparatus 102 sends the image data generated by the image capturing step to the controller 112 for further tests (step 416). The test performed by the controller 112 is, for example: subtracting the RGB values of a standard from the RGB values of the image data and producing a difference; and using the difference to determine whether the image data meets a predetermined requirement. The predetermined requirement is decided by users according to the specification of their products.

If the image data passes the test, next step is then performed. If the image data fails to pass the test, an error code is automatically recorded in the database of the server 116. When the image data is not successfully read, the flow (such as a program) stops and the test jumps out of the flow chart (step 418) to avoid an unnecessary test. Next, the second test image is shown on the display (step 420). The second test image is captured and image data is generated (step 422). The image data is sent to the controller 112 for testing. The controller 112 determines whether the image data meets a predetermined requirement (step 424). The details regarding capturing the second test image are the same as for the first test image.

If the test is passed, the next step is performed. If the image data fails to pass the test, an error code is automatically recorded in the database of the server 116. If the image data cannot be successfully read, the test jumps out of the flow to avoid unnecessary tests (step 426). Then, a similar method is used to test the third test image (step 428, 430, 432, and 434). After the test on the third test image is finished, the test system 100 returns to the initial status and settings (step 436). Then, the portable electronic apparatus 102 is taken out (step 438). The test flow mentioned above uses three test images as an example, but the invention is not limited to three test images. Users can modify the flow to provide testing for any number of test images. These modifications of changing test image numbers should still be within the scope of the invention.

In this invention, a display 108 is used to replace a conventional light box and conventional test slides. The test images shown on the display 108 are used as the targets of the image capturing module 104. The display 108 is controlled by the controller 112 and can automatically display the test images. If users need different test images to be shown on the display 108, they only have to make some modifications to the display program of the controller 112 and to change the content of the database of the test images. Therefore, there is no need to change the test images by hand and thus time and cost are greatly saved. Compared to the conventional light box and the conventional test method using test slides, the invention provides a very efficient and convenient test system.

The invention has at least the following advantages. Each embodiment can present one or more of these advantages. Because the controller automatically controls the predetermined test procedure, a portable electronic apparatus can be tested in a faster and easier way. The invention can also save labor. Because the test system can test different test images according to a predetermined procedure, a plurality of types of portable electronic apparatuses can be tested in one test station. Moreover, because the test system can be connected to a server, the test system can be more efficient by use of a database like a shop floor system. Because the holder can be replaced, different types of portable electronic apparatuses can be tested by using different types of holders. The invention uses a display to show test images for the digital image capturing module to capture, where the display is conveniently available on the market. The display is used to replace the conventional light box and conventional test slides, so that time and cost are greatly saved. The test system is also easier to control automatically by a program.

Although the present invention has been described in considerable detail with reference to certain preferred embodiments thereof, other embodiments are possible. Therefore, their spirit and scope of the appended claims should not be limited to the description of the preferred embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A test system for testing a portable electronic apparatus, the test system comprising:
    a display for displaying at least one test image;
    a platform for keeping the portable electronic apparatus at a distance from the display, the distance being suitable for the portable electronic apparatus to capture the test image displayed on the display;
    a controller connected to the display, the controller configured to control the display to display the test images sequentially, the controller configured to command the portable electronic apparatus, via a test interface, to capture the test images to produce image data, and the controller configured to determine whether the image data meet a predetermined requirement; and
    a server connected to the controller to record a serial number of the portable electronic apparatus and a test result of the image data;
    wherein the controller is configured to read the serial number from the portable electronic apparatus and to send the serial number and the test result of the image data to the server.

2. The test system of claim 1, wherein the display is an LCD panel.

3. The test system of claim 2, further comprising a light source and a reflector, the reflector reflecting the light emitted from the light source to the LCD panel so that the LCD panel reaches a predetermined and uniform brightness.

4. The test system of claim 1, wherein the portable electronic apparatus is a cell phone and the cell phone has a digital camera module.

5. The test system of claim 1, wherein the controller is a computer connected to a second display, the computer has a graphic card supporting two displays, the computer controls the two displays via the graphic card, and the second display is used to show a test result of the image data.

6. The test system of claim 1, wherein the controller is configured to read the serial number of the portable electronic apparatus via the test interface.

7. The test system of claim 1, wherein the server comprises a database configured to record a plurality of serial numbers and test results.

8. The test system of claim 7, wherein the controller is configured to read a serial number of a second portable electronic apparatus and to compare the serial number of the second portable electronic apparatus in the database to determine a test status of the second portable electronic apparatus.

9. The test system of claim 1, wherein the test interface includes an RS 232 interface.

10. A test method for testing a portable electronic apparatus, the test method comprising:
    sequentially displaying at least one test image on a display;
    reading a serial number from the portable electronic apparatus;
    commanding the portable electronic apparatus, via a test interface, to capture the at least one test image to produce image data;
    performing a test process on the image data to determine whether the image data meet a predetermined requirement; and
    recording the serial number of the portable electronic apparatus and a test result of the image data in a server.

11. The test method of claim 10, further comprising:
    commanding the portable electronic apparatus, by a controller, to capture the test images to produce the image data.

12. The test method of claim 11, wherein the controller is a computer.

13. The test method of claim 12, wherein the step of recording the serial number of the portable electronic apparatus and the test result of the image data in the server comprises the step of recording the serial number of the portable electronic apparatus and the test result of the image data in a database of the server.

14. The test method of claim 13, further comprising:
    recording a plurality of serial numbers of portable electronic apparatuses and test results of image data in the database.

15. The test method of claim 14, further comprising:
    reading a serial number of a second portable electronic apparatus via the test interface and sending the serial number of the second portable electronic apparatus to the server;
    comparing the serial number of the second portable electronic apparatus in the database by the server to determine a test status of the second portable electronic apparatus; and
    performing tests need be performed on the second portable electronic apparatus according to the test status.

16. The test method of claim 12, further comprising:
    installing a graphic card supporting two displays in the computer;
    using the graphic card to control the display and a second display; and
    using the second display to show the test result of the image data.

17. The test method of claim 11, further comprising:
performing a test process on the image data in the controller.

18. The test method of claim 10, wherein the portable electronic apparatus is a cell phone and the cell phone has a digital camera module.

19. The test method of claim 10, wherein the display is an LCD panel.

20. The test method of claim 19, further comprising:

using at least one reflector to reflect the light emitted from at least one light source to the LCD panel so that the LCD panel reaches a predetermined and uniform brightness.

* * * * *